(12) United States Patent
Haeuser et al.

(10) Patent No.: US 8,267,790 B2
(45) Date of Patent: Sep. 18, 2012

(54) INTERACTIVE GAMES ON A TELEVISION VIA INTERNET PROTOCOL

(75) Inventors: Tony Haeuser, Aurora, IL (US); Mary McCarthy, San Antonio, TX (US); Scott Pettit, San Antonio, TX (US); Chris Alan Lee, Denver, CO (US); Roland Noll, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1286 days.

(21) Appl. No.: 11/541,316

(22) Filed: Sep. 29, 2006

(65) Prior Publication Data
US 2008/0081699 A1   Apr. 3, 2008

(51) Int. Cl.
G06F 17/00 (2006.01)
(52) U.S. Cl. ........................................... 463/42
(58) Field of Classification Search ............. 463/40, 463/42; 725/135, 136, 139
See application file for complete search history.

(56) References Cited

U.S. PATENT DOCUMENTS

| | | | |
|---|---|---|---|
| 5,781,734 A | 7/1998 | Ohno | |
| 5,790,201 A | 8/1998 | Antos | |
| 5,851,149 A | 12/1998 | Xidos et al. | |
| 6,139,520 A | 10/2000 | McCrory et al. | |
| 6,141,693 A * | 10/2000 | Perlman et al. | 709/236 |
| 6,409,602 B1 | 6/2002 | Wiltshire et al. | |
| 6,539,545 B1 * | 3/2003 | Dureau et al. | 725/48 |
| 6,607,444 B2 | 8/2003 | Takahashi et al. | |
| 6,699,125 B2 | 3/2004 | Kirmse et al. | |
| 6,712,702 B2 | 3/2004 | Goldberg et al. | |
| 6,863,612 B2 | 3/2005 | Willis | |
| 7,001,279 B1 | 2/2006 | Barber et al. | |
| 7,752,648 B2 * | 7/2010 | Shelton et al. | 725/136 |
| 2002/0086734 A1 * | 7/2002 | Krishnan et al. | 463/43 |
| 2004/0025190 A1 | 2/2004 | McCalla et al. | |
| 2004/0043819 A1 | 3/2004 | Willis | |
| 2004/0111484 A1 | 6/2004 | Young et al. | |
| 2005/0155083 A1 | 7/2005 | Oh et al. | |
| 2006/0036963 A1 * | 2/2006 | Taylor | 715/768 |
| 2006/0125962 A1 * | 6/2006 | Shelton et al. | 348/588 |
| 2006/0287054 A1 * | 12/2006 | Walker et al. | 463/17 |

(Continued)

FOREIGN PATENT DOCUMENTS

EP    0714684 A1    6/1996

(Continued)

OTHER PUBLICATIONS

"Pace enables 3-d videogames", http://www.pacemicro.coPace_enables_3-dvideo_gamessitem.asp?id=902&template=0, (Oct. 31, 2002),5 pgs.

(Continued)

Primary Examiner — Ronald Laneau
(74) Attorney, Agent, or Firm — Guntin Meles & Gust, PLC; Douglas Schnabel

(57) ABSTRACT

Particular embodiments of the disclosed subject matter provide methods and systems to support interactive games on a television via internet protocol. An example embodiment includes receiving a game selection from a remote user through a set-top box via a network, activating the selected game on a games server, and communicating game rendering information to the set-top box via the network thereby enabling remotely playing the selected game via a television monitor and a remote control device.

16 Claims, 12 Drawing Sheets

U.S. PATENT DOCUMENTS

| | | | |
|---|---|---|---|
| 2007/0099694 A1* | 5/2007 | McCarthy et al. | 463/24 |
| 2008/0167127 A1* | 7/2008 | Turkstra et al. | 463/40 |
| 2008/0167128 A1* | 7/2008 | Roshak et al. | 463/40 |
| 2008/0167133 A1* | 7/2008 | White et al. | 463/43 |
| 2010/0225742 A1* | 9/2010 | Shelton et al. | 348/43 |

FOREIGN PATENT DOCUMENTS

| | | | |
|---|---|---|---|
| EP | 1391226 A1 | 2/2004 |
| WO | WO-03047710 | 6/2003 |
| WO | WO-2004012437 A2 | 2/2004 |
| WO | WO-2004079536 A2 | 9/2004 |
| WO | WO-2005028057 | 3/2005 |
| WO | WO-2008042623 A2 | 4/2008 |
| WO | WO-2008042623 A3 | 4/2008 |

OTHER PUBLICATIONS

"Samsung SPH-B5200—the phone for TV-loving gamers", http://www.mobilemag.com/content/100/340/C6899/, (Mar. 13, 2006).

"Eurpoean Application Serial No. PCT/US2007/079127, Partial European Search Report mailed Apr. 1, 2008", 5 pgs.

"Pace enables 3-d videogames", http://www.pacemicro.coPace_enables_3-d_videogamessitem.asp?id=902&template=0, (Oct. 31, 2002), 5 pgs.

"International Application Serial No. PCT/US2007/079127, International Search Report and Written Opinion mailed Oct. 7, 2008", 18 pgs.

* cited by examiner

Interactive Game System Processing Logic -1200-

Receive a game selection from a first remote user via a first platform device via a network
-1210-

Receive the game selection from a second remote user via a second platform device via the network
-1212-

Activate the selected game on a games server
-1214-

Communicate game rendering information to the first platform device and the second platform device via the network thereby enabling multi-player remote playing of the selected game
-1216-

Exit

Figure 12

INTERACTIVE GAMES ON A TELEVISION VIA INTERNET PROTOCOL

TECHNICAL FIELD

The disclosed subject matter relates to the field of online games and television, and more particularly to systems and methods supporting interactive games on a television via internet protocol.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006, SBC Knowledge Ventures L.P. All Rights Reserved.

BACKGROUND

Conventional systems provide the capability for online game players to play interactive games between networked computer users. Conventional game consoles provide the capability to play video games on a standard television set. However, conventional systems do not fully support interactive games played on a television via internet protocol. One problem with conventional systems has been that games with animation-intensive scenes or fast-twitch user interaction could not be implemented across a network without unsatisfactory delays in game action. In other conventional television (TV) game implementations, TV games can be initially downloaded to a set-top box and subsequently played using a processor in the set-top box. However, these implementations require a set-top box with special components that support gaming. Additionally, conventional systems do not satisfactorily support multi-platform and multi-player interactive games played on a television via internet protocol.

Thus, a system and method supporting interactive games on a television via internet protocol are needed.

BRIEF DESCRIPTION OF THE DRAWINGS

FIGS. 8-12 are processing flow diagrams illustrating various methods related to example embodiments of an interactive game system in accordance with the disclosed subject matter.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter.

As described further below, according to various example embodiments of the disclosed subject matter described herein, there is provided a system and method supporting interactive games on a television via internet protocol. The system can include a set-top box device comprising a processor and a memory accessible to the processor. The system can also include a computer program embedded within the memory and executable by the processor, the computer program comprising instructions to receive a user interface at the set-top box device via a private network within an Internet Protocol Television (IPTV) system, where the user interface includes at least one type of game playable via a public network. The set-top box device can be associated with a public network user account at a server within the IPTV system, and the at least one type of game can be associated with a user preference received at the public network user account.

Figure 1:
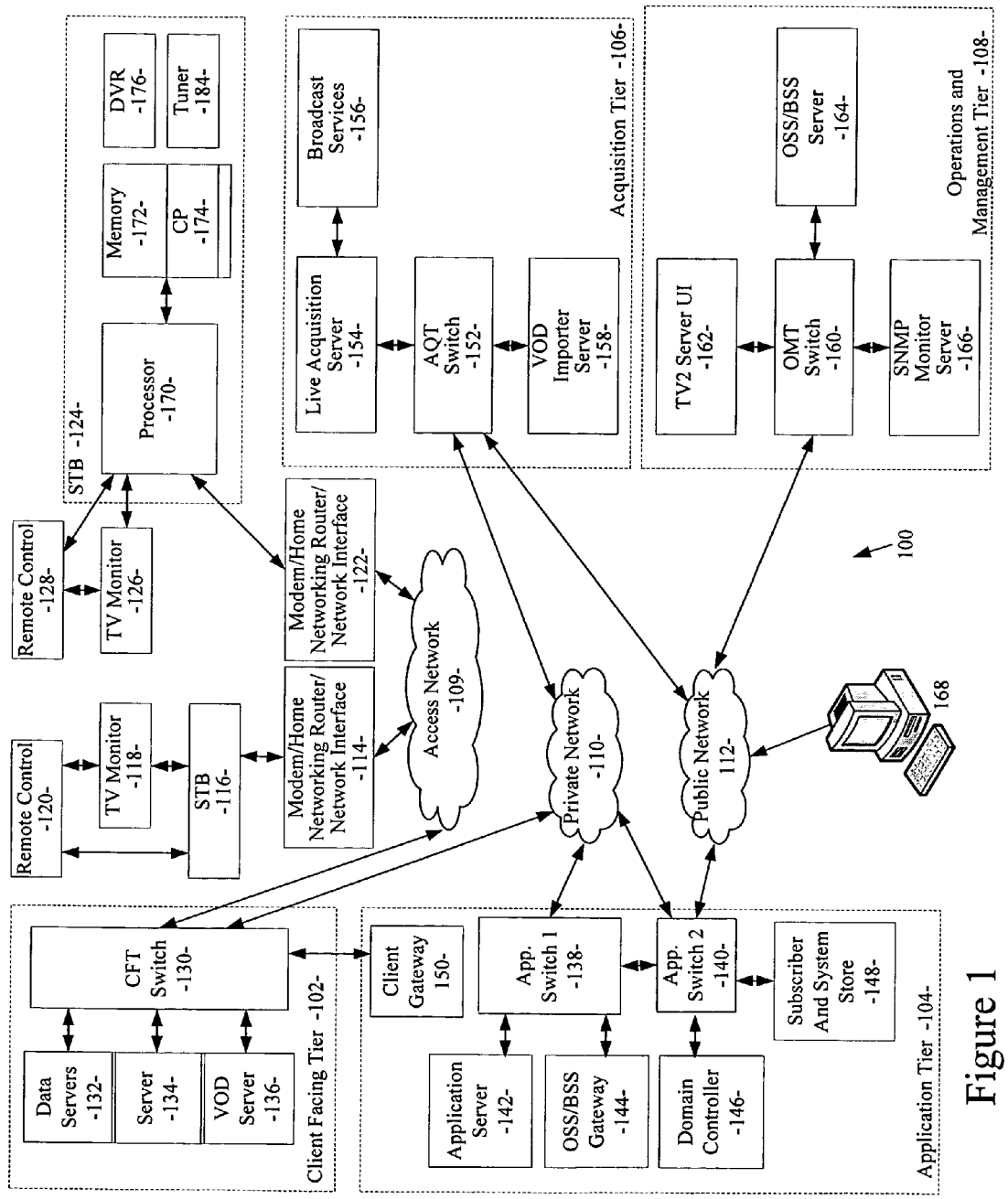
FIG. 1 is a block diagram illustrating an embodiment of an Internet Protocol Television (IPTV) system.

Referring to FIG. 1, an example embodiment of an IPTV system is shown and is generally designated 100. As shown, the system 100 can include a client facing tier 102, an application tier 104, an acquisition tier 106, and an operations and management tier 108. Each tier 102, 104, 106, 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet. The acquisition tier 106 can also be coupled to the private network 110 and to the public network 112. Moreover, the operations and management tier 108 can be coupled to the public network 112.

As shown in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

As illustrated in FIG. 1, the client-facing tier 102 can communicate with user equipment via a private access network 109, such as an Internet Protocol Television (IPTV) network. In an illustrative embodiment, conventional network interface devices including modems, home networking routers, and network interface hardware can be used to connect a user to the private access network 109. As shown in FIG. 1, modem/home networking router/network interface devices (denoted herein as network interfaces) 114 and 122 can be coupled to the private access network 109. The client-facing tier 102 can communicate with a first representative set-top box device 116 via the first network interface 114 and with a second representative set-top box device 124 via the second network interface 122. The client-facing tier 102 can similarly communicate with a large number of set-top boxes, such as the representative set-top boxes 116, 124, over a wide geographic area, such as a regional area, a metropolitan area, a viewing area, or any other suitable geographic area that can be supported by networking the client-facing tier 102 to numerous set-top box devices.

In one embodiment, the client-facing tier 102 can be coupled to the network interfaces 114, 122 via fiber optic cables. Alternatively, the network interfaces 114 and 122 can include digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 109, via an IPTV software platform, such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128.

In an exemplary, non-limiting embodiment, each set-top box device 116, 124 can receive data or video from the client-facing tier 102 via the private access network 109 and render or display the data or video at the display device 118, 126 to which it is coupled. In an illustrative embodiment, the set-top box devices 116, 124 can include tuners, such as the tuner 184 shown in FIG. 1, that receive and decode television programming information for transmission to the display devices 118, 126. Further, the set-top box devices 116, 124 can include a STB processor 170 and a STB memory device 172 that is accessible to the STB processor 170. In a particular embodiment, the set-top box devices 116, 124 can also communicate commands received from the remote control devices 120, 128 back to the client-facing tier 102 via the private access network 109.

In an illustrative embodiment, the client-facing tier 102 can include a client-facing tier (CFT) switch 130 that manages communication between the client-facing tier 102 and the private access network 109 and between the client-facing tier 102 and the private network 110. As shown, the CFT switch 130 is coupled to one or more data servers 132 that store data transmitted in response to user requests, such as video-on-demand content. The CFT switch 130 can also be coupled to a server 134 that provides support for terminal devices, such as a game application server 168 and other devices with a common connection point to the private network 110. In a particular embodiment, the CFT switch 130 can also be coupled to a video-on-demand (VOD) server 136.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116, 124 via the private access network 109, so the set-top box devices 116, 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the system 100 via the private access network 109, using information received from the client gateway 150. The private access network 109 provides security for the private network 110. User devices can access the client gateway 150 via the private access network 109, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 109.

For example, when a set-top box device 116 accesses the system 100 via the private access network 109, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content delivered by a game application server 168 via server 134 and/or VOD content delivered via VOD server 136. If the client gateway 150 cannot verify subscriber information for the set-top box device 116, e.g., because it is connected to a different twisted pair, the client gateway 150 can deny transmissions to and from the set-top box device 116 beyond the private access network 109.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch 152 can be coupled to a video-on-demand importer server 158 that stores television content received at the acquisition tier 106 and communicates the stored content to the client-facing tier 102 via the private network 110.

FIG. 1 further illustrates that the operations and management tier 108 can include an operations and management tier (OMT) switch 160 that manages communication between the operations and management tier 108 and the public network 112. In the embodiment illustrated in FIG. 1, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television content to the AQT switch 152, in turn, and the AQT switch 152 can transmit the television content to the CFT switch 130 via the private network 110. Further, the CFT switch 130 can communicate the television content to the network interfaces 114, 122 via the private access network 109. The set-top box devices 116, 124 can receive the television content from the network interfaces 114, 122, decode the television content, and transmit the content to the display devices 118, 126 according to commands from the remote control devices 120, 128.

Additionally, at the acquisition tier 106, the video-on-demand (VoD) importer server 158 can receive video-on-demand content from one or more VoD sources outside the IPTV system 100. The VoD importer server 158 can transmit the VoD content to the AQT switch 152, and the AQT switch 152, in turn, can communicate the content to the CFT switch 130 via the private network 110. The VoD content can be stored within the plurality of data servers 132.

When a user issues a request for VOD content to a set-top box device 116, 124, the request can be transmitted over the private access network 109 to the VOD server 136, via the CFT switch 130. Upon receiving such a request, the VOD server 136 can retrieve requested VOD content from the plurality of data servers 132 and transmit the content to the set-top box device 116, 124 across the private access network 109, via the CFT switch 130.

In an illustrative embodiment, the live acquisition server 154 can transmit the television content to the AQT switch 152, and the AQT switch 152, in turn, can transmit the television content to the OMT switch 160 via the public network 112. In this embodiment, the OMT switch 160 can transmit the television content to the TV2 server 162 for display to users accessing the user interface at the TV2 server 162. For example, a user can access the TV2 server 162 using the computer 168 coupled to the public network 112.

As shown in FIG. 1, the domain controller 146 communicates with the public network 112 via the second APP switch 140. Additionally, the domain controller 146 can communicate via the public network 112 with one or more user computers 168 (e.g. a personal computer or PC). For example, the domain controller 146 can display a web portal via the public network 112 and allow users to access the web portal using a PC 168. In this manner, the user can use the PC 168 to access a web portal maintained by the domain controller 146, via the public network 112. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124, by associating the user account with an IP address of the second set-top box device 124, with data relating to one or more twisted pairs connected with the second set-top box device 124, with data relating to one or more fiber optic cables connected with the second set-top box device 124, with an alphanumeric identifier of the second set-top box device 124, with any other data that is suitable for associating second set-top box device 124 with a user account, or with any combination of these.

In a particular embodiment, after the domain controller 146 has authenticated and verified the user, the domain controller 146 can allow the user to access his or her public data network user account, such as an Internet account, via the PC 168. The user can enter preferences to the user account via the PC 168. Each preference can indicate a type of content or game that the user prefers to play in conjunction with a web browser at the PC 168 and/or with a television display transmitted to a display device 118, 126 by a set-top box device 116, 124. Further, the user can enter game preferences to the user account via the PC 168.

Upon receiving one or more user preferences from the user via the PC 168, the domain controller 146 can generate a user interface, or data associated with rendering a user interface, that incorporates the preferences received from the user. The user interface or related data can be associated with the user's set-top box device 116, 124 and stored in conjunction with the user's Internet account. This information may be stored at the domain controller 146, at the subscriber and system store 148, or at any one or more components of the IPTV system 100 that are suitable for storing a user interface in conjunction with a set-top box identification and for communicating the user interface or related data to a web browser via the PC 168 and to a set-top box 116, 124 via the private access network 109.

In an exemplary, non-limiting embodiment, a user can request that the user interface associated with the user's set-top box device be displayed in conjunction with a web browser at the PC 168. The user interface, or data associated with the user interface, can be transmitted by the domain server 146 to the PC 168 via the public network 112. The PC 168 can display the user interface via its screen or monitor, or the PC 168 can generate and render the user interface from related data that it has received via its display. The user interface can overlay a portion of the web browser, or at least partially frame the web browser.

In another example embodiment, the user can request that the user interface be displayed in conjunction with television content at a display device 118, 126. The request can be received from the user's set-top box 116, 124 at the CFT switch 130 via the private access network 109. The request can be transmitted by the CFT switch 130 via the private network 112 to the device that stores the user interface, or data associated with the user interface, in conjunction with the user's account, such as the domain controller 146 or the subscriber and system store 148. The user interface or related data can be received at the CFT switch 130 and transmitted to the requesting set-top box device 116, 124 via the private access network 109. In a particular embodiment, the CFT switch 130 can also transmit television programming that it receives from the acquisition tier 106 along with the user interface.

As shown in FIG. 1, a set-top box device, such as the second set-top box device 124, can include a processor 170 and a memory device 172 that is accessible to the processor 170. The set-top box device 124 can also include a computer program 174 that is embedded within the memory device 172. In a particular embodiment, the computer program 174 can include instructions to receive a user interface and/or game that incorporate at least one content/game preference that a user has entered at a user account on a public network via the domain controller 146. In another embodiment, the computer program 174 can include instructions to receive data associated with the user interface and/or game and instructions to generate and render the user interface and/or game at the display device 118, 126. The user interface and/or game can overlay a portion of the television programming, or at least partially frame the television programming, when the user interface and/or game is displayed at the display device 118, 126.

In an illustrative embodiment, the computer program 174 can include instructions to receive selections of web content at the set-top box device 124 via the user interface and to transmit web content to the display device 126. For instance, a user can make selections on the user interface or control movements in an interactive game by using a remote control 128 to communicate with the set-top box device 124. After the set-top box device 124 receives the user's selection/control movement data, the set-top box device 124 can transmit the selection/control movement data to the CFT switch 130 via the private access network 109. The CFT switch 130 can transmit the selection/control movement data to the domain controller 146 via the private network 110, for example, and the domain controller 146 can retrieve the requested web content from the public network 112. The selected web content can be communicated back to the CFT switch 130 and to the set-top box device 124 via the private access network 109. The set-top box device 124 can receive the selected content and transmit it to the display device 126 for display to the user. Additionally, selection/control movement data can be transmitted from the CFT switch 130 to server 134 and forwarded to a game server 168. The game server 168 can process the selection/control movement data and communicate responsive data back to server 134. Server 134 then forwards the responsive data to CFT switch 130, which forwards the responsive data to the associated set-top box device 124 via the private access network 109. The set-top box device 124 can receive and process the responsive data and generate updated images for display to the user on the display device 126.

Figure 2:
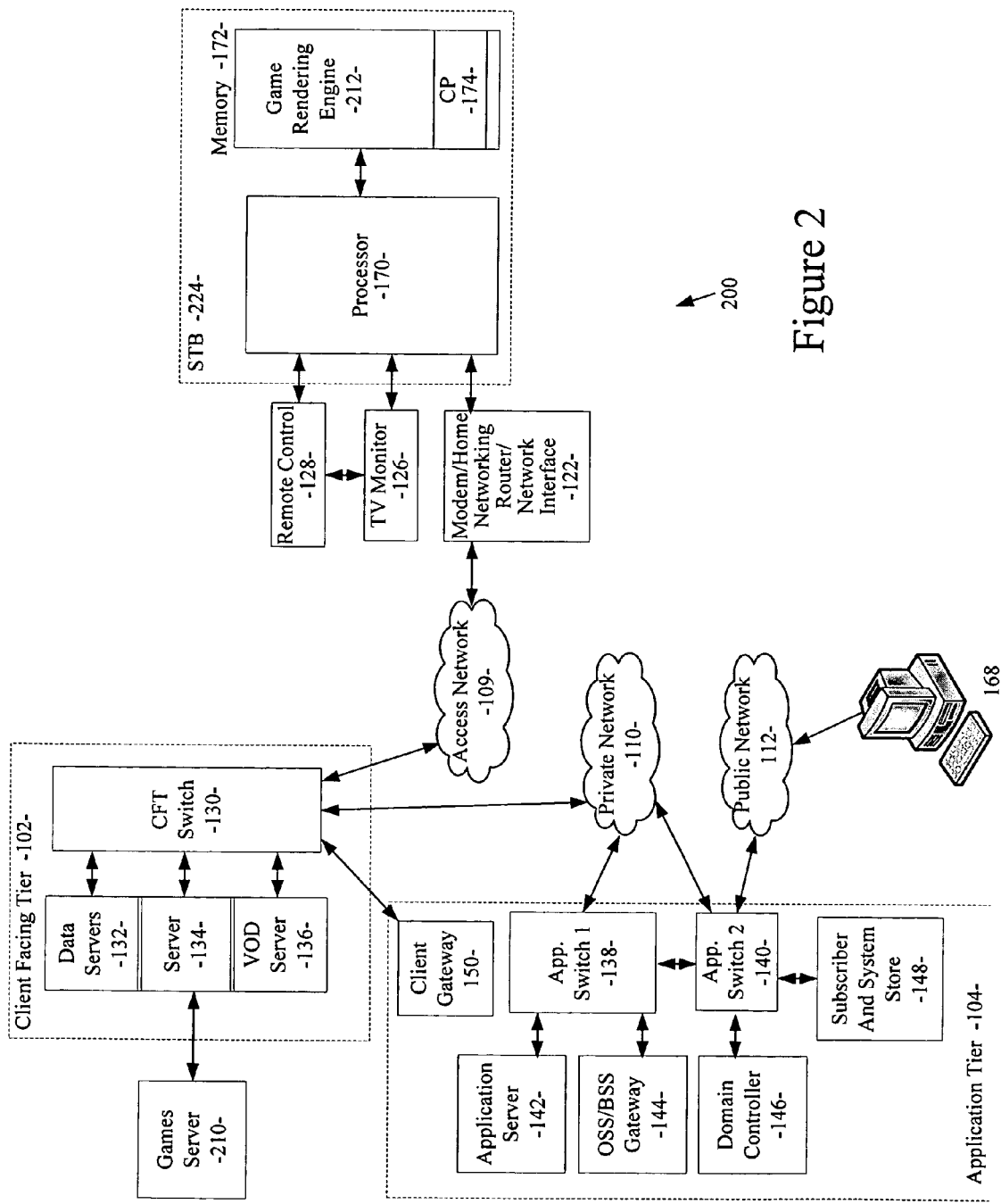
FIGS. 2-6 illustrate various example embodiments of an interactive game system in accordance with the disclosed subject matter.

Referring to FIG. 2, an example embodiment of an interactive game system is shown and is generally designated as system 200. In system 200, a games server 210 is shown coupled to server 134. In this configuration, games can be remotely processed and set-top box 224 can include a game rendering engine 212 that draws game imagery on TV monitor 126. The games server 210 can communicate with set-top box 224 via Internet Protocol. The games provided to the end user at TV monitor 126 can be accessed via several entry points on the television monitor 126 and controlled via remote control device 128. Each entry point can enable the user to switch from a live video stream on an acquisition server 154 in the network to a separate games server 210, which opens a session with a game application. The games may be hosted by the games server 210 or at another source with a secure data link.

As shown in FIG. 2, games may be spooled via games server 210 (e.g. an RDP (remote desktop protocol) server) through an Interactive channel on the TV monitor 126 and controlled via remote control device 128 and set-top box 224. The example embodiment shown in FIG. 2 is not an optimal system for high-action games (i.e. games requiring fast-twitch input); but the example embodiment shown in FIG. 2 is ideal for "parlour" games where a "quick trigger" isn't the game-winning factor. In a typical embodiment, the network communication will be on a unicast data stream.

In general, the system of an example embodiment comprises a television monitor including a remote control device, a set-top box connectable with the television monitor and with a network, and a games server connectable with the set-top box via the network, the games server to receive a game selection from a remote user via the set-top box, to activate the selected game on the games server, and to communicate game rendering information to the set-top box thereby enabling remotely playing the selected game via the television monitor and the remote control device.

Figure 3:
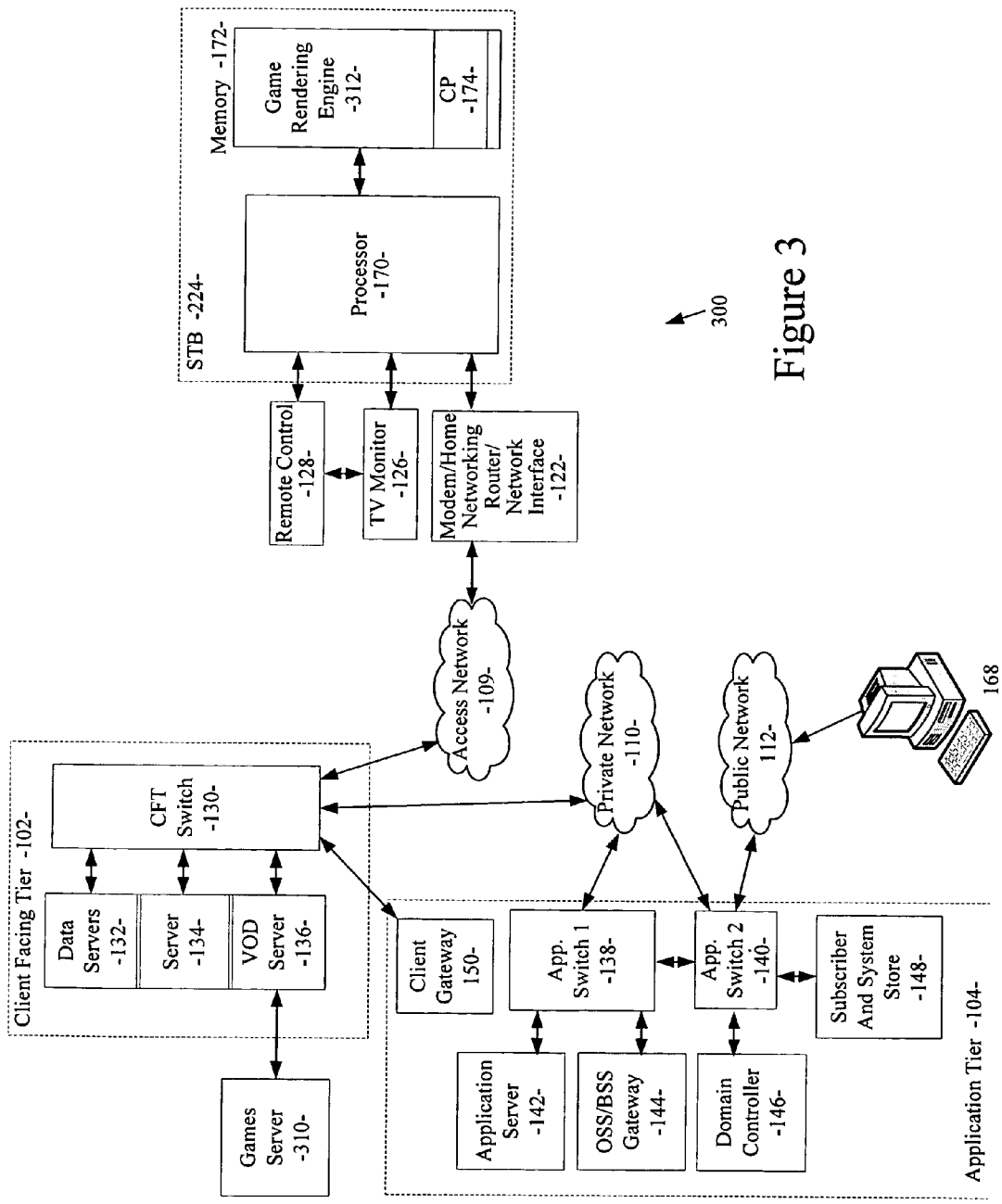

As shown in FIG. 3, another example embodiment of an interactive game system is shown and is generally designated as system 300. In system 300, a games server 310 is shown coupled to Video-on-demand (VOD) server 136. In this configuration, games may be converted to a VoD format (e.g. MP3) so that the animation intensive portions of the game can be re-encoded and further compressed. The responses to user inputs through remote control device 128 can be handled in smaller data packets, so that the network bandwidth is optimized for more action-oriented (e.g. user input intensive) games. In a typical embodiment, the network communication will be on a unicast data stream.

In general, the system of an example embodiment comprises a television monitor including a remote control device, a set-top box connectable with the television monitor and with a network, a video on demand (VoD) server connectable with the network to convert at least a portion of a game to a VoD format, and a games server connectable with the set-top box and the video on demand (VoD) server via the network, the games server to receive a game selection from a remote user via the set-top box, to activate the selected game on the games server, to request the video on demand (VoD) server to convert at least a portion of a game to a VoD format, and to communicate game information to the set-top box thereby enabling remotely playing the selected game via the television monitor and the remote control device.

Figure 4:
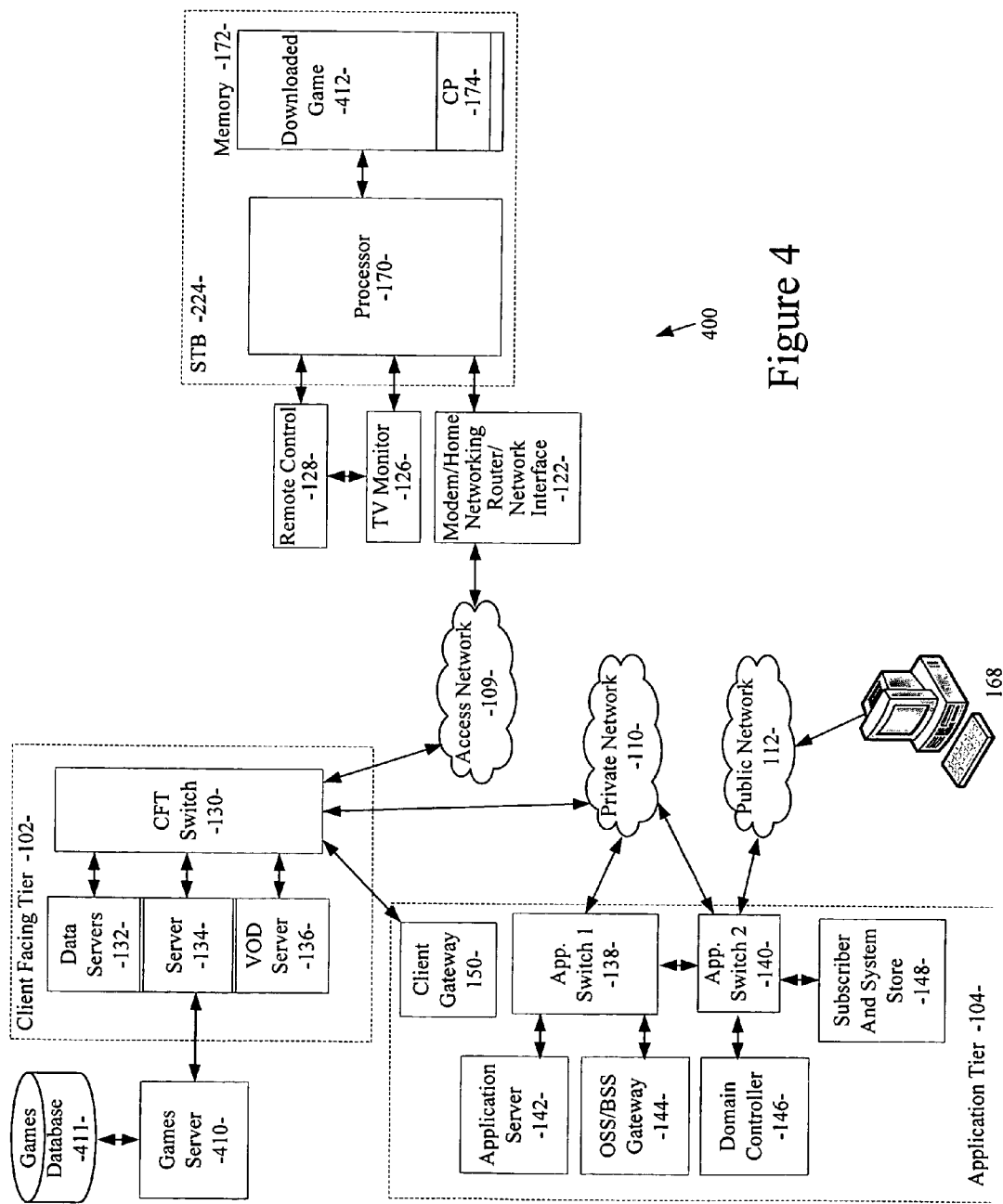

Referring to FIG. 4, another example embodiment of an interactive game system is shown and is generally designated as system 400. In system 400, a games server 410 is shown coupled to server 134. A games database 411 is shown coupled to games server 410. In this configuration, games can be remotely selected, accessed, and downloaded by a user from games database 411 to the memory 172 of set-top box 224 via games server 410. As a result, a downloaded game 412 can be made resident in set-top box 224 memory and executed locally by set-top box 224 processor 170. Downloading the games directly to the set-top box 224 can be done via a unicast data stream as shown in FIG. 4. This embodiment will take all network traffic off of the network (after the initial download), but will require more decoding and processing abilities in the set-top box 224. Using video decoding for the game action sequences and optimizing the rest of the game processing on the set-top box 224 will enable the use of "trigger-friendly" (e.g. user input intensive) games. The example embodiment shown in FIG. 4 may also be used to distribute and/or sell downloaded games directly to the user, when games can be downloaded through the network to a console device (in addition to a set-top box).

In general, the system of an example embodiment comprises a television monitor including a remote control device, a set-top box connectable with the television monitor and with a network to execute a game downloaded via the network, and a games server connectable with the set-top box via the network, the games server to receive a game selection from a remote user via the set-top box, and to download the selected game to the set-top box via the network.

Figure 5:
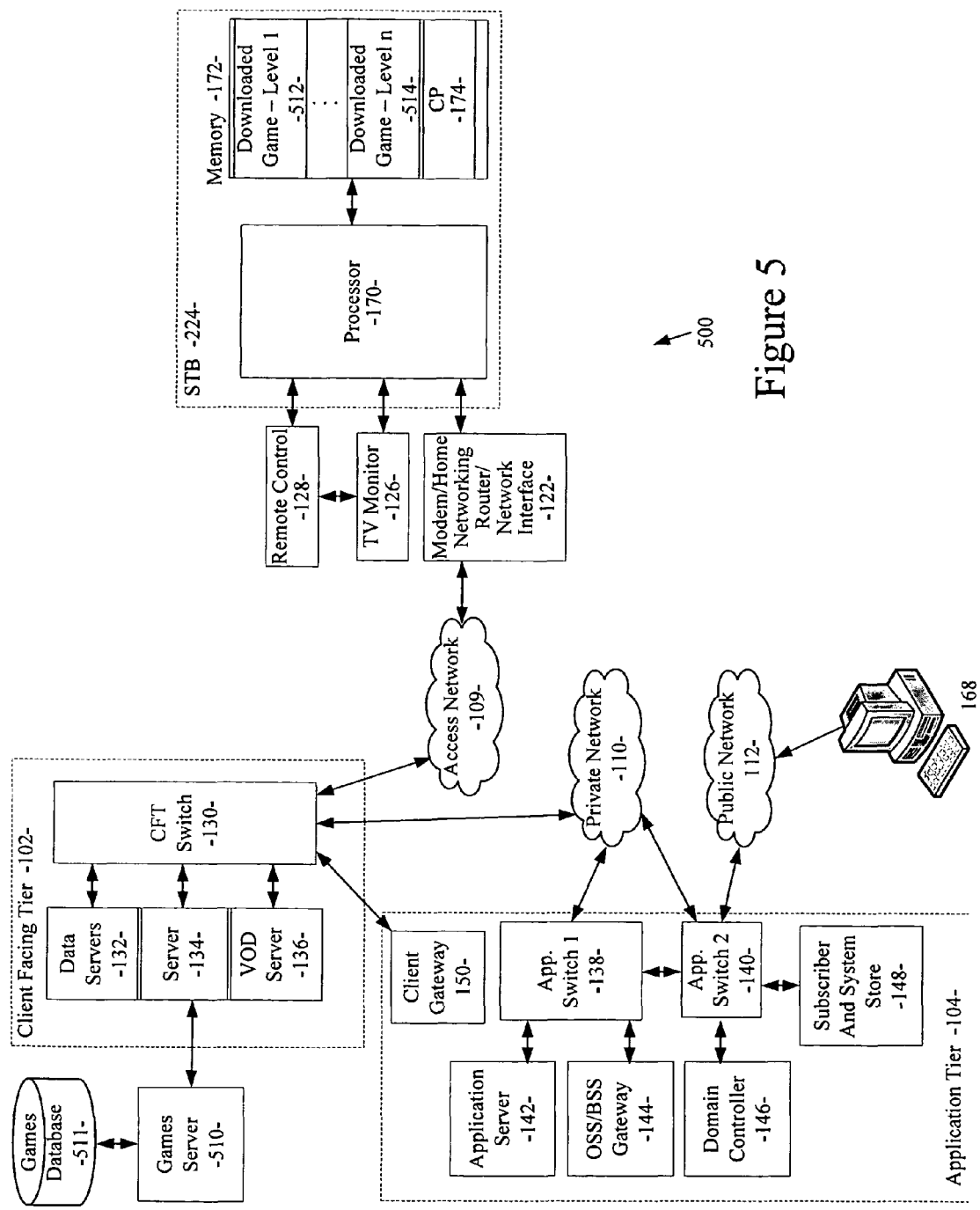

Referring to FIG. 5, another example embodiment of an interactive game system is shown and is generally designated as system 500. In system 500, a games server 510 is shown coupled to server 134. A games database 511 is shown coupled to games server 510. In this configuration and in a manner similar to system 400, games can be remotely selected, accessed, and downloaded by a user from games database 511 to the memory 172 of set-top box 224 via games server 510. However, in system 500, a particular game in game database 511 can be partitioned into a plurality of separately downloadable partitions (e.g. separately downloadable levels). For example, as is well known to those of ordinary skill in the art, conventional games are typically offered in a plurality of levels. Game players can play at a first level until the level has been won/completed. Then, the game player can advance to a next level. In system 500, the game selected by the user can be downloaded one level at a time and stored in set-top box 224 memory 172 as downloaded game level 1 (512). The set-top box 224 can then execute the downloaded game level 1 (512) until the user wins or completes the level. At that point, the user can initiate the downloading of the next level of the game from games database 511. The next downloaded game level is stored in set-top box 224 memory 172 as downloaded game level n (514). The set-top box 224 can then execute the new downloaded game level n (514) until the user wins or completes that level. The process can be repeated for each available game level. As a result, a downloaded game can be made resident in set-top box 224 memory one level at a time and executed locally by set-top box 224 processor 170. System 500 enables one to optimize the space on a set-top box 224 and not use all of the memory 172 for a single game. In this manner, games may be downloaded to the set-top box 224 by "level". As the user achieves game goals and earns the right to move on, the set-top box 224 will make another call to the games server 510 requesting a new downloaded stream of the next game level. The game performance at the previous level may be uploaded to the games server 510 to retain the user's progress through the game levels. Once the new game level is downloaded to the set-top box 224, actual game decoding will now be done at the new game level. Downloading the games level by level directly to the set-top box 224 can be done via a unicast data stream as shown in FIG. 5.

In general, the system of an example embodiment comprises a television monitor including a remote control device, a set-top box connectable with the television monitor and with a network to execute a game downloaded via the network, and a games server connectable with the set-top box via the network, the games server to receive a game selection and a level selection from a remote user via the set-top box, and to download the selected level of the selected game to the set-top box via the network.

Figure 6:
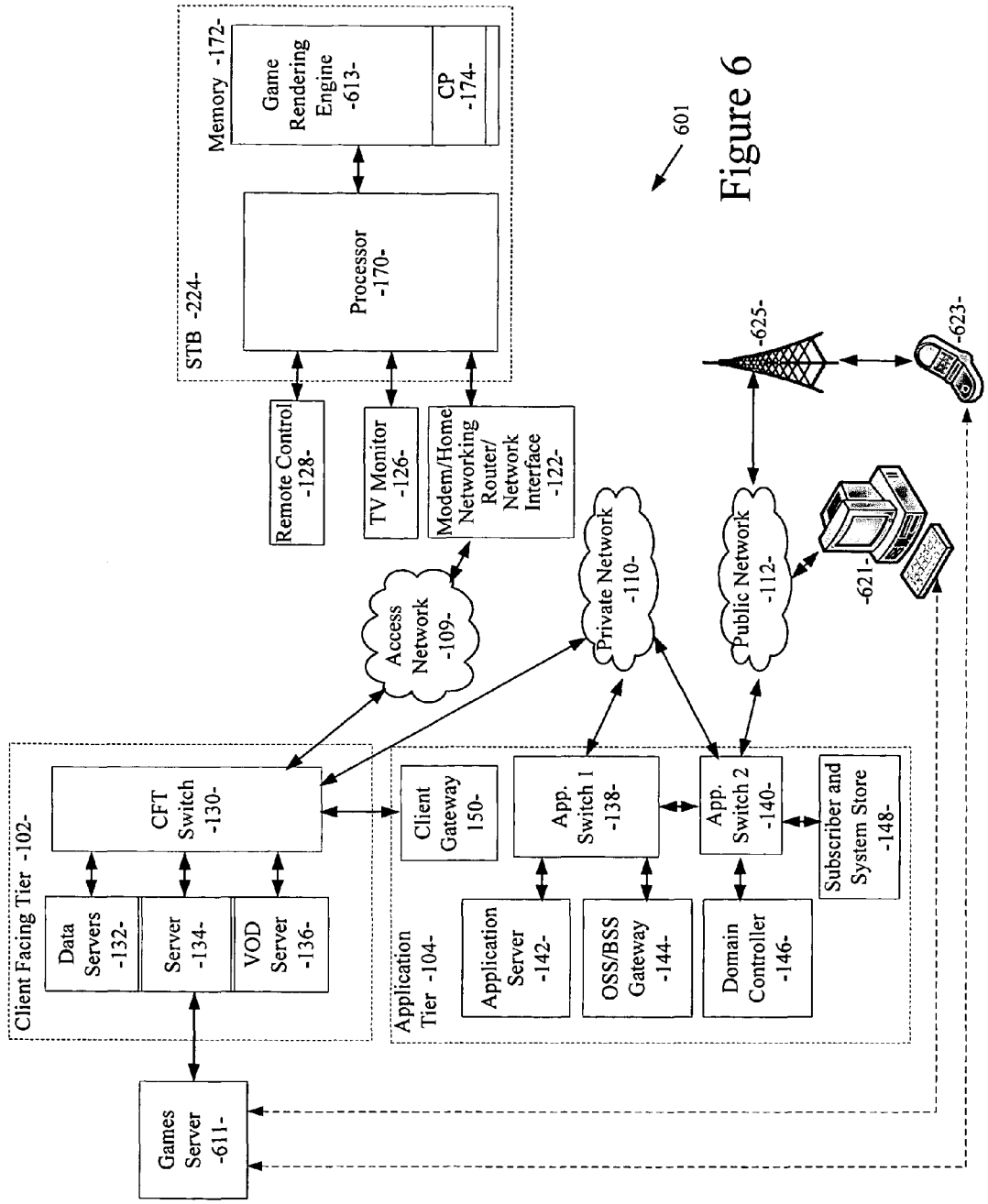

Referring to FIG. 6, an example embodiment of a multi-platform multi-player interactive game system is shown and is generally designated as system 601. In system 601, a games server 611 is shown coupled to server 134. A first game user at TV monitor 126 can access and execute a selected game using any of the embodiments described above. Additionally, other users can access games server 611 via public network 112, Application switch 2 (140), private network 110, CFT switch 130, and server 134. For example, a personal computer user can use personal computer 621 to access games server 611. A wireless device user can use a wireless device (e.g. cellphone) 623 to access games server 611 via wireless system 625 and public network 112. The logical connection between the games server 611 and computer 621 and wireless device 623 is shown by the dashed lines between these components in FIG. 6. In this manner, a plurality of users on a plurality of different platforms (e.g. 621 and 623) can access games server 611. Given the access by multiple remote game players as described above, games server 611 can initiate a game with multiple players all playing in the same game environment or playing the same game. Due to the nature of Internet Protocol delivery and the system designs described above, users are able to get the same type of games on multiple devices (e.g. multiple platforms, such as STB 224, computer 621, or wireless device 623). The games servers 611 on the back end of the system 601 enable multi-player game play within and external to the IPTV network. This means that a user can maintain a list of "buddies" to play against where each of the multiple players could: 1) be on their TV 126 within the system 601; 2) be on various devices (e.g multiple platforms) not necessarily on the IPTV network, but that integrate together via the games servers 611 on the back end; or 3) a user, for example, may be on TV 126 playing chess against a remote competitor on their cell phone 623.

In general, the system of an example embodiment comprises a television monitor including a remote control device, a set-top box connectable with the television monitor and with a network, a second platform device connectable with the network, and a games server connectable with the set-top box and the second platform device via the network, the games server to receive a game selection from a first remote user via the set-top box, to receive a game selection from a second remote user via the second platform device, to activate the selected game on the games server, and to communicate game rendering information to the set-top box and the second platform device thereby enabling multi-player remote playing of the selected game via the television monitor and the remote control device and the second platform device.

Using the various example interactive game systems described above, users can obtain several advantages not presently available. In particular, users will have the ability to have contextual or related games appear on-screen at the same time as a live video stream. Additionally, users will have the ability to embed games into a broadcast video stream. For example, a user could play along with a game show (e.g. Jeopardy) while watching the video feed. Additionally, users will have the ability to include contextual games related to sports games so that the user may track an un-related "fantasy" sports team while watching some of their "players" compete with their specific league teams. Additionally, users will have the ability to play/pause and resume games so that the user may tune away briefly from a games channel and return to the game without penalty or loss of game status.

Figure 7:
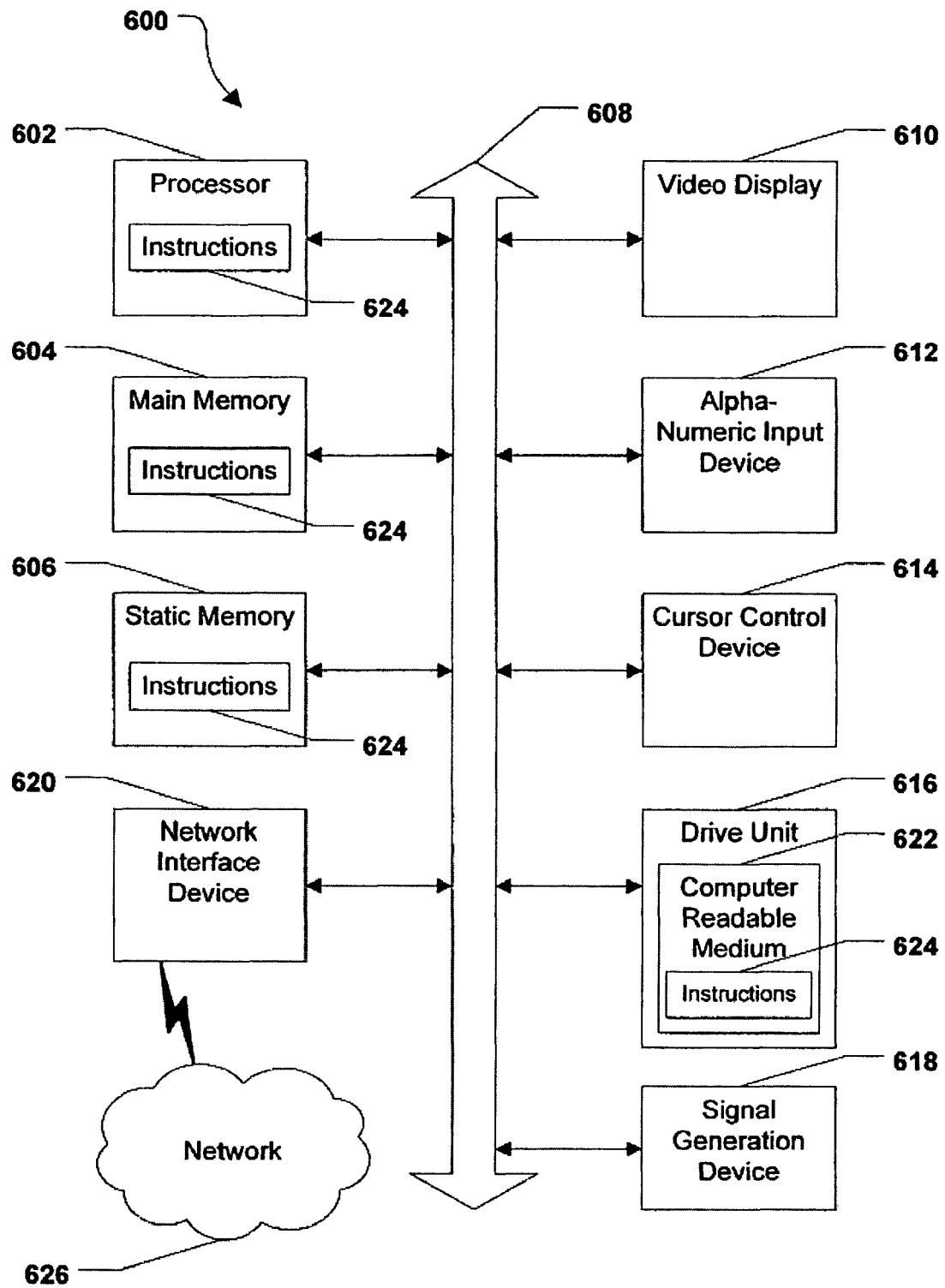
FIG. 7 illustrates an example embodiment of a computing system in accordance with the disclosed subject matter.

Referring to FIG. 7, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device, such as the set-top box devices and servers shown in FIGS. 1-6, or may be connected, e.g., using a public network or a private network within an IPTV system, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 7, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. When the computer system 600, or any portion thereof, is embodied in a set-top box device, the cursor control device 614 can be a remote control device. The computer system 600 can also include a disk drive unit 616, a signal generation device 618, such as a speaker or remote control, and a network interface device 620.

In a particular embodiment, as depicted in FIG. 7, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure and methods described herein, a system and method supporting interactive games on a television via internet protocol is described. The interactive games are selectable and can be played via an interactive user interface that is linked to a user's preferences. By associating user accounts with set-top box devices at the server level, preferences will be retrieved and recognized without the need for a user to log in to his or her television. Moreover, by attaching set-top box devices to Internet accounts, users can access and play personalized and interactive games.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 8:
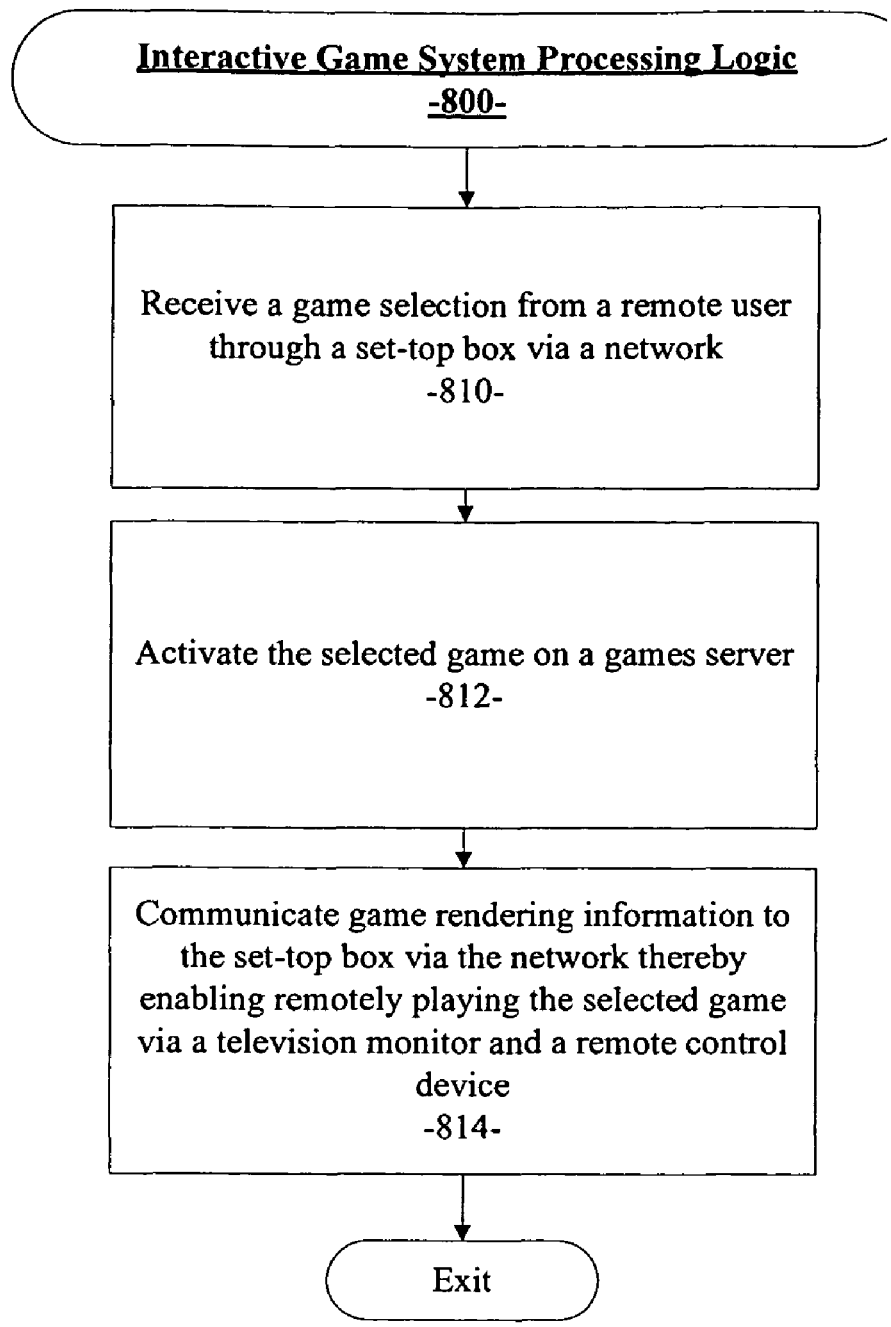

FIGS. 8-12 are processing flow diagrams illustrating various methods related to example embodiments of an interactive game system in accordance with the disclosed subject matter. As shown in FIG. 8, an example method includes receiving a game selection from a remote user through a set-top box via a network (processing block 810), activating the selected game on a games server (processing block 812); and communicating game rendering information to the set-top box via the network thereby enabling remotely playing the selected game via a television monitor and a remote control device (processing block 814).

Figure 9:
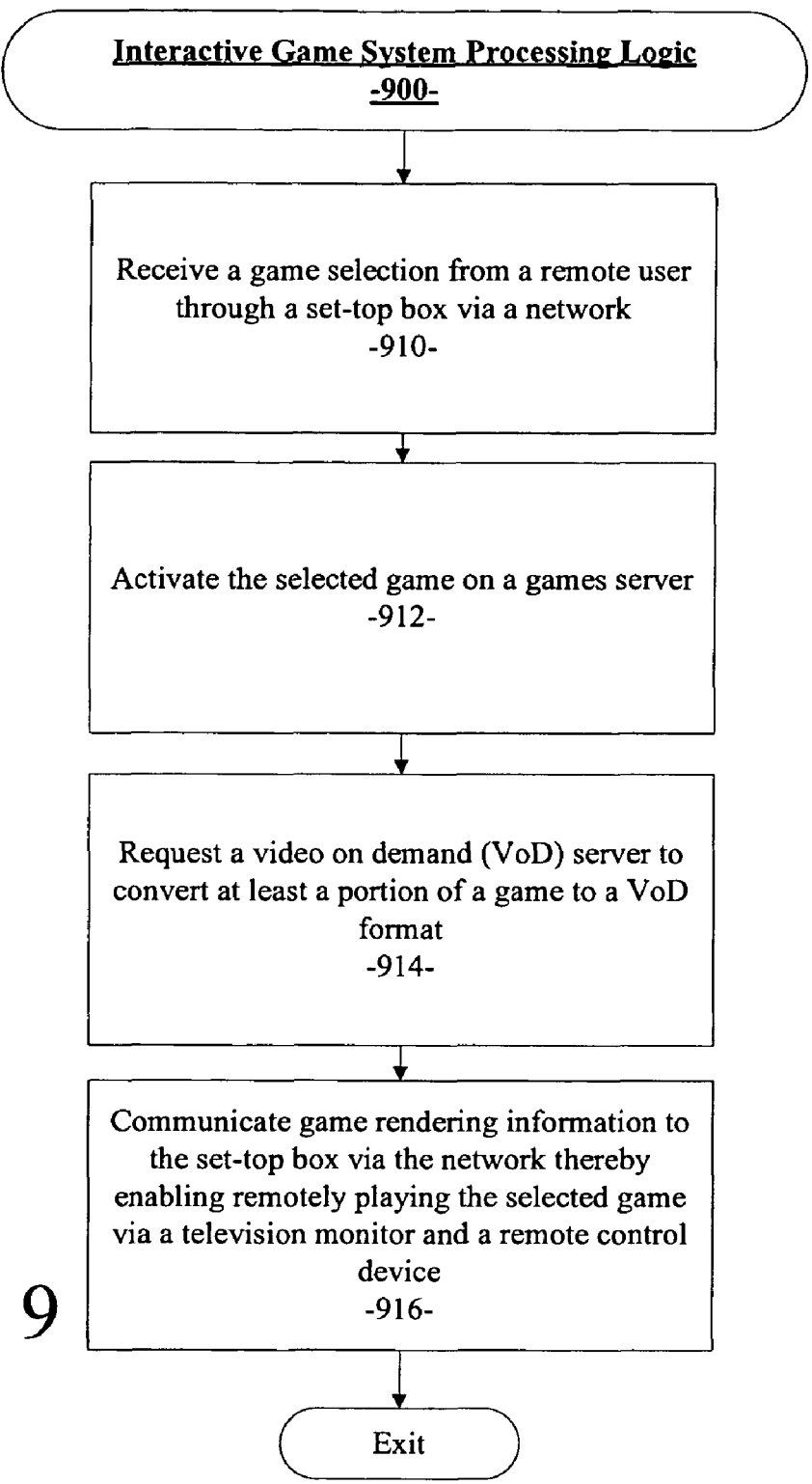

As shown in FIG. 9, an example method includes receiving a game selection from a remote user through a set-top box via a network (processing block 910), activating the selected game on a games server (processing block 912), requesting a video on demand (VoD) server to convert at least a portion of a game to a VoD format (processing block 914), and communicating game rendering information to the set-top box via the network thereby enabling remotely playing the selected game via a television monitor and a remote control device (processing block 916).

Figure 10:
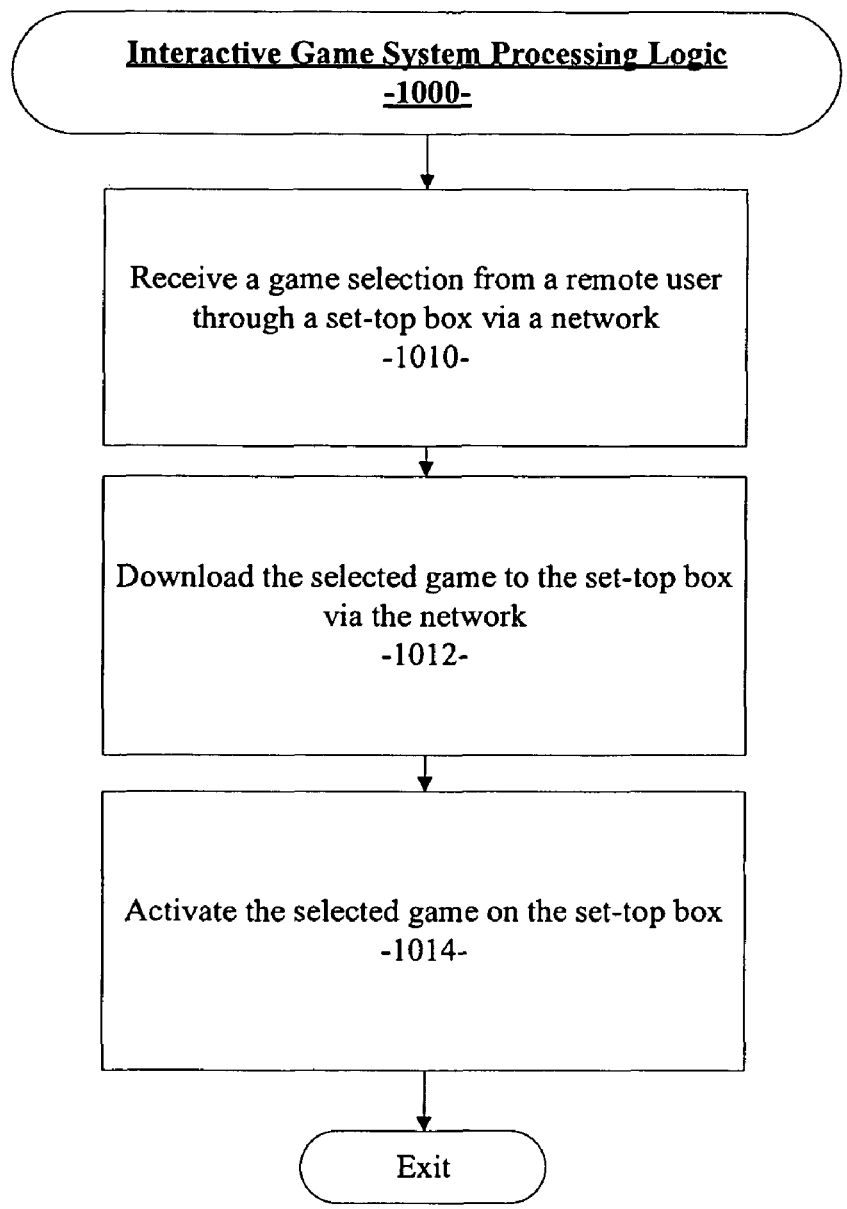

As shown in FIG. 10, an example method includes receiving a game selection from a remote user through a set-top box via a network (processing block 1010), downloading the selected game to the set-top box via the network (processing block 1012), and activating the selected game on the set-top box (processing block 1014).

Figure 11:
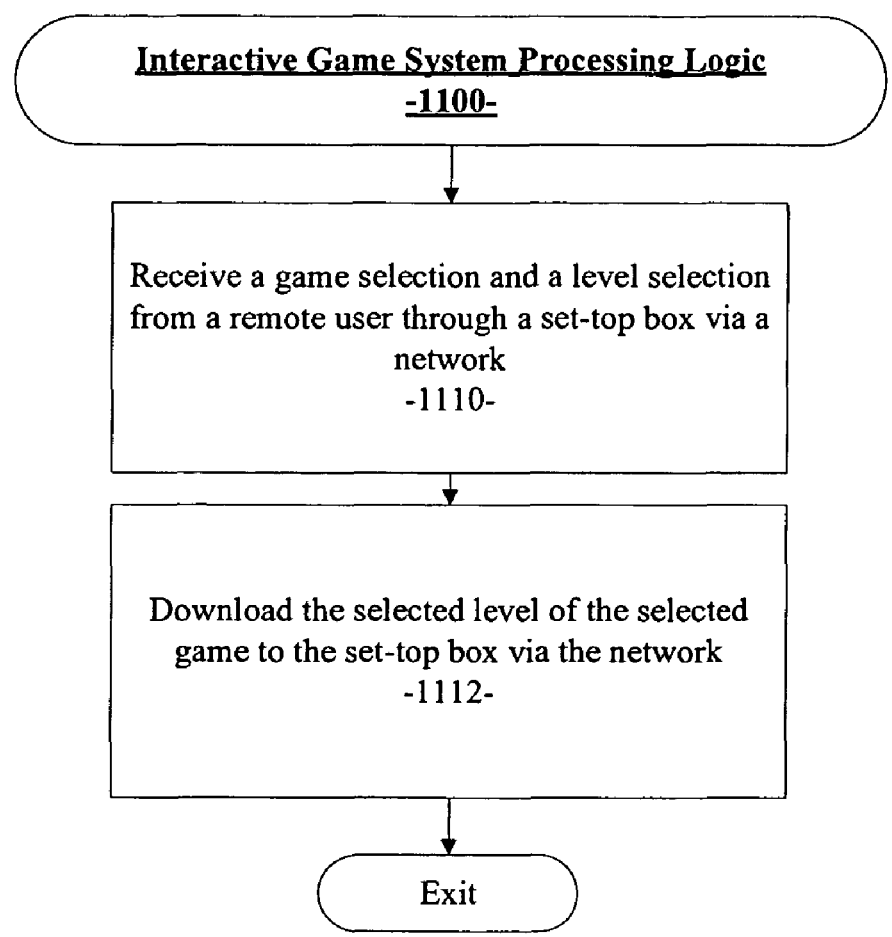

As shown in FIG. 11, an example method includes receiving a game selection and a level selection from a remote user through a set-top box via a network (processing block 1110), and downloading the selected level of the selected game to the set-top box via the network (processing block 1112).

As shown in FIG. 12, an example method includes receiving a game selection from a first remote user via a first platform device via a network (processing block 1210), receiving the game selection from a second remote user via a second platform device via the network (processing block 1212), activating the selected game on a games server (processing block 1214), and communicating game rendering information to the first platform device and the second platform device via the network thereby enabling multi-player remote playing of the selected game (processing block 1216). As described above, games can be delivered to a user television and played by the user in a variety of ways. However, as a service provider, it is important to include an infrastructure for billing the user for the selected and delivered games. As described below, various methods can be used to charge a user for network-delivered games. These methods include the ability to promote games, to gain user interest before the user commits to paying for a fully-functional network-delivered game, to join games communities, and to foster user loyalty in a game service.

Currently, games are available through U.S. broadcast TV services for free or for a subscription for cable-delivered games. Games delivered via Internet Protocol (IP) are currently only available on a personal computer platform (PC), for which service providers charge subscription fees, require a fee-per-play, or are free (e.g. Yahoo! games). None of the currently-available games services on television offer the opportunity to join games communities, to try before you buy, or to foster user loyalty in a game service.

In support of a consumer billing infrastructure as part of the interactive game system on television via internet protocol of the various embodiments as described above, the games platform is integrated with IPTV ordering and billing systems in an example embodiment to ensure the customer is billed in a similar fashion to linear subscriptions or Video-on-Demand (VoD) purchases. IPTV ordering and billing systems can include paid subscription-based games (MRC and ARC) and usage-based games (pay-per-play) that can be accessed as follows in an example embodiment:

Provisioned as a Channel in the television guide
Provided from the Main Menu
Remote Control keypress (e.g., Go Interactive button).
Provided through a "games storefront"
Provided with Multi-Platform games functionality—IPTV, Broadband, Wireless
Provided with the ability to accept input from dual remote controls (for games). Use case would apply to a game optimized for TV that offers same multiplayer functionality.

In various embodiments, the provisioning of the payment options and the promotion of games can be implemented in various ways. In one embodiment, both free and purchasable games (subscription-based and usage-based) can be provisioned as RDP Channels (e.g. a dedicated channel), as a Main Menu selection (either interactive sub-menu or through a "games storefront"), and via the Remote Control (e.g., Go Interactive button). The IPTV system presents viewers who are not subscribed to the games content with a purchase sequence for purchasable games (e.g. subscription-based and pay-per-play), whether accessed from a linear content channel, Main Menu, or Remote Control key press (e.g., Go Interactive button). The purchase sequence top screen includes an offer panel and displays either a static full screen promotion (e.g. poster art) or video promotion when the channel is selected by the customer. In an example embodiment, the purchase sequence will maintain the "look and feel" of a VoD or pay-per-view (PPV) purchase so as not to confuse the customer. Customers are provided with the ability to "trial" subscription packages and pay-per-play games. This can be handled similarly to the preview before a VoD purchase. In one embodiment, the meta-data surrounding the game will include some functionality that is rated at a $0 price point (i.e. free trial functionality). The core of the game (i.e. full functionality) will have a real price point (i.e. a price greater than $0) attached to the full functionality. Customers selecting the free trial option will be presented with screen that includes Game poster art, package description, duration of trial period and a "Try It Free" button. When the "Try it Free" button is selected, customers can receive a play grant and can get redirected to the Games Top Page for the selected package or pay-per-play game. In an example embodiment, flexible trial period parameters, e.g., 1-hour, 24-hours, 3-day pass, 30-day trial can be configured. These settings can be configurable within IPTV. In an example embodiment, these settings will be included in the game meta-data similarly to the "tar-ball" associated with VoD licensing. For subscription games, trial periods can be restricted to one per game package, per account, per (xx # of days, e.g., 120 days). For example: Mary signs up for a 3-day pass for a Kids Game Package. Mary would then be restricted from receiving any additional Free Trial for the Kids Games Package for 120-days from the expiration date of the initial trial period. The trial restriction period e.g., 1-month, 3-months, 6-months, 12-months is configurable within IPTV. For pay-per-play games, an example embodiment can offer one free game play, per account, per (xx # of days, e.g., 120 days). For example: When a customer selects the "Try It Free" button, they can be granted access to the game for "x" number of plays, e.g., 1, 3, or a set period of time, e.g. 1-hour. In another example embodiment, fantasy games can be supported with a seasonal subscription, Join league functionality, or Create and Manage your own league functionality.

Subscription and usage-based games can be billed separately, or may also be bundled with other video assets to up-sell bolt-on packages (VoD, SVoD and PPV). Below are some price packaging examples to illustrate the desired functionality.

Games Subscription Package–Only

Customer orders a Game Subscription Package for $x.xx/month. This is a monthly recurring charge (MRC).

On Demand (SVoD)+Games Subscription Package

Customer orders an On Demand content service for $x.xx and gets a Game subscription package free for the first month and $x.xx thereafter at a bundled pricing discount.

Kids+Games Subscription Package

Customer orders a Kids content service for $x.xx/month and gets a Games subscription package free for the first month and $x.xx thereafter at a bundled pricing discount.

All In One Package

Customer orders a Classics content service+Kids content service+On Demand content service+Games at bundled price of $xx.xx/month VoD purchase+Game Pass (Trial)

Customer orders a VoD movie and gets a free 3-day Games Pass. After 72-hours, the consumer would be notified and prompted to purchase a Games Subscription.

Various embodiments include the ability for customers to purchase a bundle of units for a one-time charge, e.g., "5 Plays for $5", and receive a purchase display when each unit is consumed. That is, for example, if the customer is using the third consumption of the "5 Plays for $5", the customer can be advised that they have two more units available as part of the original purchase. Various embodiments include usage based promotions for gaming such that a buy x units within y period can be supported. This will allow a marketing operation to run promotions such as "buy Quake for a one time fee of $10 and re-start game 5 times within the next 24 hrs". Various embodiments also support loyalty-based programs for gaming. For example, a loyalty program can accumulate "gaming" points based on time/spend/performance by a user. A loyalty program can enable a user to redeem points for cash/prize/IPTV discounts. This can be expanded across IPTV to drive revenue and user interaction, and reduce churn. Some games may include the ability for the user to advance by purchasing implements to better enable their ability to play. This may include the purchase of a "spell" for a fantasy game, or the purchase of armor for an action-based game. Various embodiments include the ability for the user to make those "accoutrement" purchases through the IPTV platform described above.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising a memory coupled to a processor, wherein the memory comprises computer instructions, which when executed by the processor, cause the processor to perform operations comprising:
   receiving a game selection from a set-top box;
   activating the selected game; and
   communicating to the set-top box a game rendering video stream embedded in a broadcast video stream to enable remote play of the selected game via a television monitor and a remote control device while further enabling simultaneous display via the television monitor of a television program supplied in the broadcast video stream.

2. The apparatus as claimed in claim 1 wherein the processor is configured to open a session with a game application corresponding to the selected game.

3. The apparatus as claimed in claim 1 wherein the processor is configured to communicate with the set top box via a secure data link.

4. The apparatus as claimed in claim 1 wherein the processor is configured to spool the selected game to the set-top box through an interactive channel on the television monitor.

5. A system comprising:
   a video on demand server communicatively coupled to a network to convert at least a portion of a game to a video on demand format; and
   a games server connectable with a set-top box and the video on demand server via the network, wherein the games server is adapted to perform operations comprising:
   receiving a game selection from a remote user via the set-top box;

activating the selected game on the games server, to request the video on demand server to convert at least a portion of a game to a video on demand format; and communicating a game video stream to the set-top box to enable remote play of the selected game via a television monitor and a remote control device.

6. The system as claimed in claim 5 wherein at least a portion of the selected game is converted to a moving pictures expert group 3 format.

7. The system as claimed in claim 5 wherein network communications between the game server and the set-top box is over a unicast data channel.

8. An apparatus comprising a memory coupled to a processor, wherein the memory comprises computer instructions, which when executed by the processor, cause the processor to perform operations comprising:

receiving a game selection at a user interface;

communicating the game selection to the games server; and receiving from the games server a game rendering video stream embedded in a broadcast video stream to enable remote play of the selected game via a television monitor and a remote control device while further enabling simultaneous display via the television monitor of a media program supplied in the broadcast video stream.

9. The apparatus as claimed in claim 8 wherein the processor is configured to communicate to the games server via a secure data link.

10. A method comprising:

receiving a game selection from a remote user through a set-top box via a network;

activating the selected game on a games server; and communicating a game rendering video stream embedded in a broadcast video stream to the set-top box via the network to enable remote play of the selected game via a television monitor and a remote control device while further enabling simultaneous display via the television monitor of a media program supplied in the broadcast video stream.

11. The method as claimed in claim 10 wherein the games server opens a session with a game application corresponding to the selected game.

12. The method as claimed in claim 10 wherein the games server is communicatively coupled to the set top box via a secure data link.

13. A method comprising:

receiving a game selection from a remote user through a set-top box via a network;

activating the selected game on a games server;

requesting a video on demand server to convert at least a portion of the selected game to a video on demand format; and communicating a game rendering video stream embedded in a broadcast video stream to the set-top box via the network, to enable remote play of the selected game via a television monitor and a remote control device while further enabling simultaneous display via the television monitor of a media program supplied in the broadcast video stream.

14. The method as claimed in claim 13 wherein at least a portion of the selected game is converted to an MP3 format.

15. An article of manufacture comprising at least one non-transitory machine readable storage medium having one or more computer programs stored thereon and operable on one or more computing systems at least to:

receive a game selection from a remote user through a set-top box via a network;

activate the selected game; and communicate a game rendering video stream embedded in a broadcast video stream to the set-top box via the network to enable remote play of the selected game via a television monitor and a remote control device while further enabling simultaneous display via the television monitor of a media program supplied in the broadcast video stream.

16. The article of manufacture as claimed in claim 15 wherein the one or more computing systems are operable to connect to the set top box via a secure data link.

* * * * *